United States Patent [19]
Grün et al.

[11] Patent Number: 5,303,803
[45] Date of Patent: Apr. 19, 1994

[54] VARIABLE DASHPOT FOR MOTOR VEHICLES

[75] Inventors: Wolfgang Grün, Ennepetal; Reinhard Hölscher, Salzkotten, both of Fed. Rep. of Germany; Bodo Fütterer, Luzern, Switzerland; Jürgen Mayer, Sachseln, Switzerland; Peter Wolf, Luzern, Switzerland

[73] Assignee: August Bilstein GmbH & Co. KG, Ennepetal, Fed. Rep. of Germany

[21] Appl. No.: 681,141

[22] Filed: Apr. 5, 1991

[30] Foreign Application Priority Data

Apr. 7, 1990 [DE] Fed. Rep. of Germany ....... 4011358

[51] Int. Cl.$^5$ .................. F16F 9/46; B60G 17/06
[52] U.S. Cl. ............................. 188/299; 188/319
[58] Field of Search .............. 188/299, 319, 322.15; 251/129.11, 129.12; 280/707

[56] References Cited

U.S. PATENT DOCUMENTS

| | | | |
|---|---|---|---|
| 4,671,392 | 6/1987 | Wossner | 188/319 X |
| 4,723,640 | 2/1988 | Beck | 188/319 |
| 4,754,855 | 7/1988 | Kuwana et al. | 188/319 X |
| 4,926,983 | 5/1990 | Taubitz et al. | 188/319 X |
| 4,948,091 | 8/1990 | Satoh et al. | 251/129.11 |
| 5,035,306 | 7/1991 | Ashiba | 188/299 |

FOREIGN PATENT DOCUMENTS 3611315  10/1987  Fed. Rep. of Germany ............. 188/322.15

*Primary Examiner*—Robert J. Oberleitner
*Assistant Examiner*—Peter M. Poon
*Attorney, Agent, or Firm*—Max Fogiel

[57] ABSTRACT

A variable dashpot for motor vehicles A cylinder (2) full of vibration-suppressing fluid accommodates a piston (3). The piston is provided with vibration-suppressing valves, is fastened to a piston rod (8), and separates the cylinder into two compartments. The compartments communicate through a bypass. The cross-section of the bypass can be adjusted with a component (11) comprising a stator (12) with windings (13) and an electric motor (10) with a rotor (17). The improvement comprises making it possible to continuously and highly dynamically vary the cross-section of the bypass in a dashpot of the same size. This is attained in that the stator windings are accommodated directly in a recess (9) in the piston rod, which is made out of a material that can be magnetized, and the rotor is provided with permanent magnets (22), activates the adjusting component (11), and is accommodated in a bore in the stator (12).

9 Claims, 3 Drawing Sheets

VARIABLE DASHPOT FOR MOTOR VEHICLES

BACKGROUND OF THE INVENTION

Variable dashpots are intended to allow the driving characteristics of a vehicle to be adapted to the varying road conditions. Additional adjustable bypass valves are associated with vibration-suppression valves in the piston. They can be controlled with manually activated switches or by an electronic paragraph that varies the vibration suppression in accordance with varying input parameters.

German 3 405 315 A 1 discloses a variable dashpot for vehicles in which an electric motor of the type called a micromotor is accommodated in the piston rod and controls a component that varies the cross-section of the bypass. Since even such motors are fairly large, however, the piston rod must also be large. The motor occupies space otherwise employed for backing up the vibration-suppression fluid, and the device must be expanded or extended. These known electric motors also have the drawback of too long a response time for automated controls.

The object of the present invention in to improve a variable dashpot to allow continuous and highly dynamic adjustments to the cross-section of the bypass in a dashpot of acceptable dimensions.

This object is attained in accordance with the invention by providing a cylinder and piston in which vibration-suppressing fluid fills the cylinder and the piston has vibration-suppressing valves. The piston separates the cylinder into two compartments which communicate through a bypass cross-section which is adjustable. The adjustment is produced through an electric motor which has stator windings held in a recess of the piston rod that is attached to the piston. The piston rod is made of magnetic material. The rotor of the motor has permanent magnets and is held in a bore in the stator.

The rotor is arranged so as not to rotate more than 360° in relation to the stator, by a rotation limiter which is provided with stops. The adjustment of the bypass cross-section is carried out with an adjusting component that is integrated into the rotor. The rotor, moreover, may be provided with a thread that engages another thread for moving the adjustment component which cannot rotate back and forth. A position sensor may be associated with either the rotor or the adjusting component.

The invention has several advantages. Very few components are employed, few enough to ensure simple assembly of a system for adjusting the open cross-section of a bypass. The embodiment in accordance with the invention is highly reliable and, due to its small size, can be employed in a highly dynamic system. A variable dashpot can easily be employed in the space usually occupied by a non-variable dashpot. This is a particular advantage in conjunction with industrial-scale manufacture.

BRIEF DESCRIPTION OF THE DRAWINGS

One embodiment of the invention will now be described with reference to the drawing, wherein.

DESCRIPTION OF THE PREFERRED EMBODIMENTS

Figure 1:
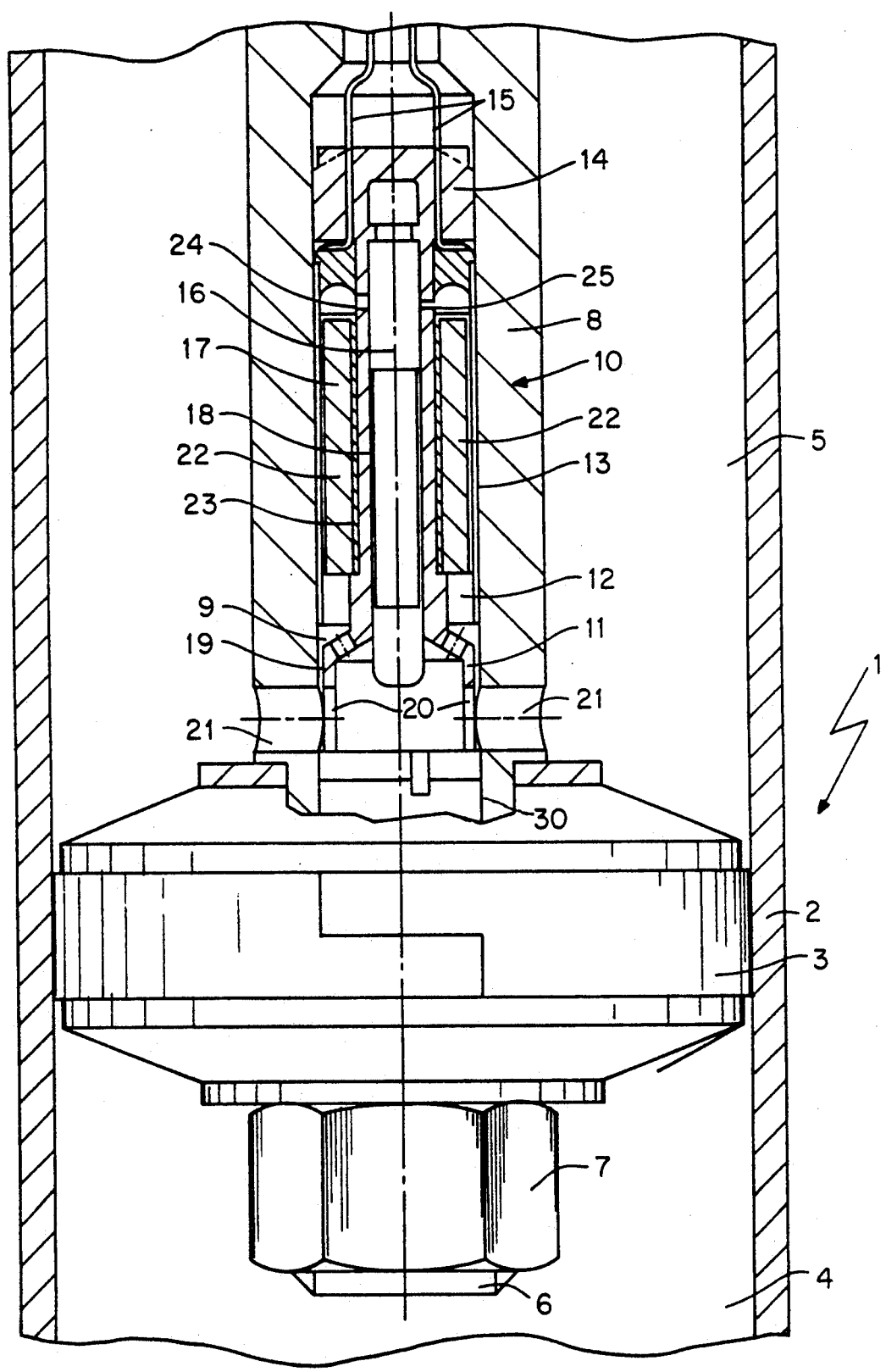
FIG. 1 is a section through a single-cylinder dashpot wherein the component that adjusts the bypass rotates and FIG. 2 is a similar section illustrating a component that travels back and forth.

A dashpot 1 has an outer cylinder 2, that is separated into a lower compartment 4 and an upper compartment 5 by a piston 3. The piston has known (unillustrated) vibration-suppression valves and is fastened by a threaded section 6 and nut 7 to a piston rod 8. The piston rod has a cylindrical recess 9 that accommodates and secures an electric motor 10 that is integrated into an adjusting component 11. The motor has a stator 12 in the form of a thin surface consisting strictly of windings 13 secured together by an appropriate adhesive, like molded plastic. The stator is molded to the motor's head 14. An electric cable 15 extends through the head and hence through the hollow rod or by another route into the engine compartment of the motor vehicle.

The head 14 in the illustrated embodiment has a drive shaft 16 that secures and positions a rotor 17.

The rotor 17 in the embodiment illustrated in FIG. 1 has a support 18. Adjusting component 11 is integrated in the form of a valve cage 19 into support 18. Valve cage 19 has one or more perforations 20 and constitutes in conjunction with additional perforations 21 in piston rod 8 the adjustable cross-section bypass. The cross-section is adjusted by rotating the perforations 20 in adjusting component 11 in relation to the perforations 21 in piston rod 8.

Figure 3:
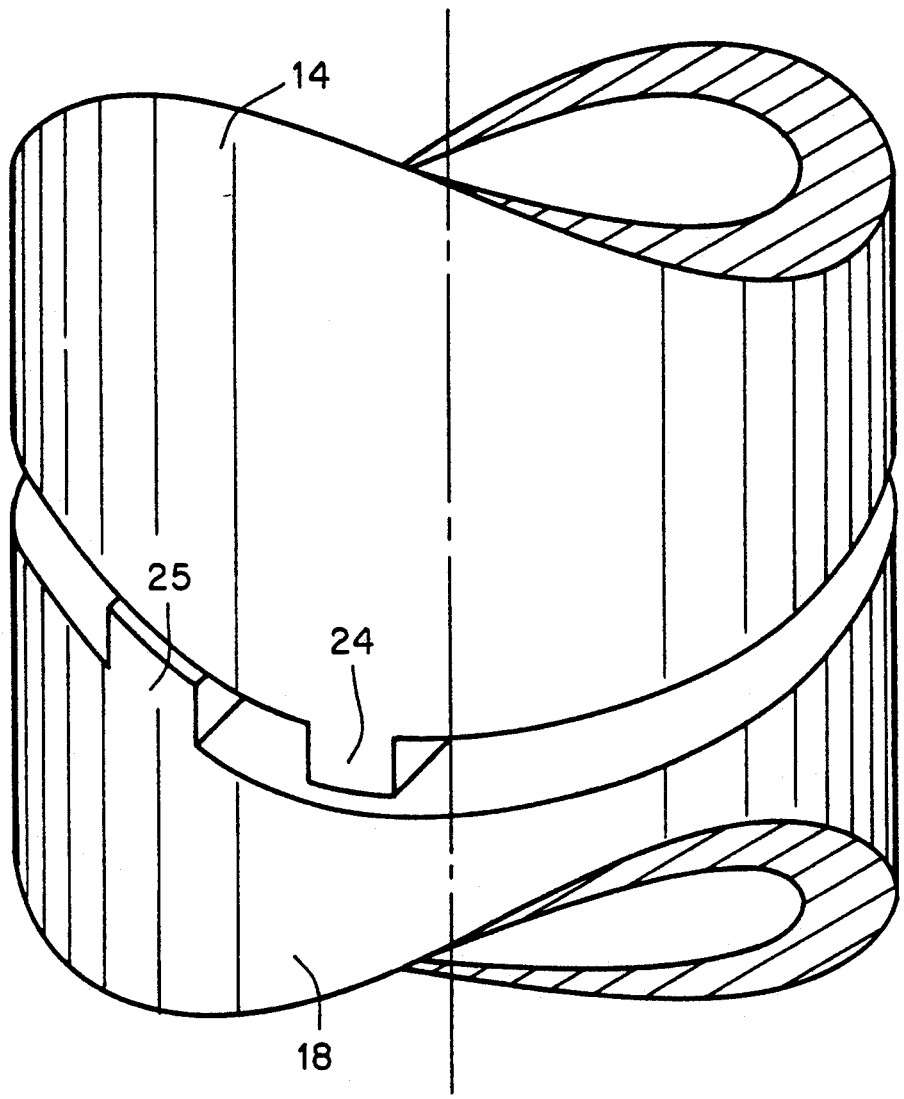
FIG. 3 is a perspective view and shows the arrangement for limiting rotation of the rotor.

Permanent magnets 22 are fastened to support 18 by a layer of molded plastic 23 and accordingly constitute a rotor 17. Head 14 and support 18 are provided with stops 24 and 25 that prevent the rotor from rotating more than 360°, as shown in FIG. 3.

A position sensor 30 may be associated with either the rotor 17 or the adjusting component 11.

Figure 2:
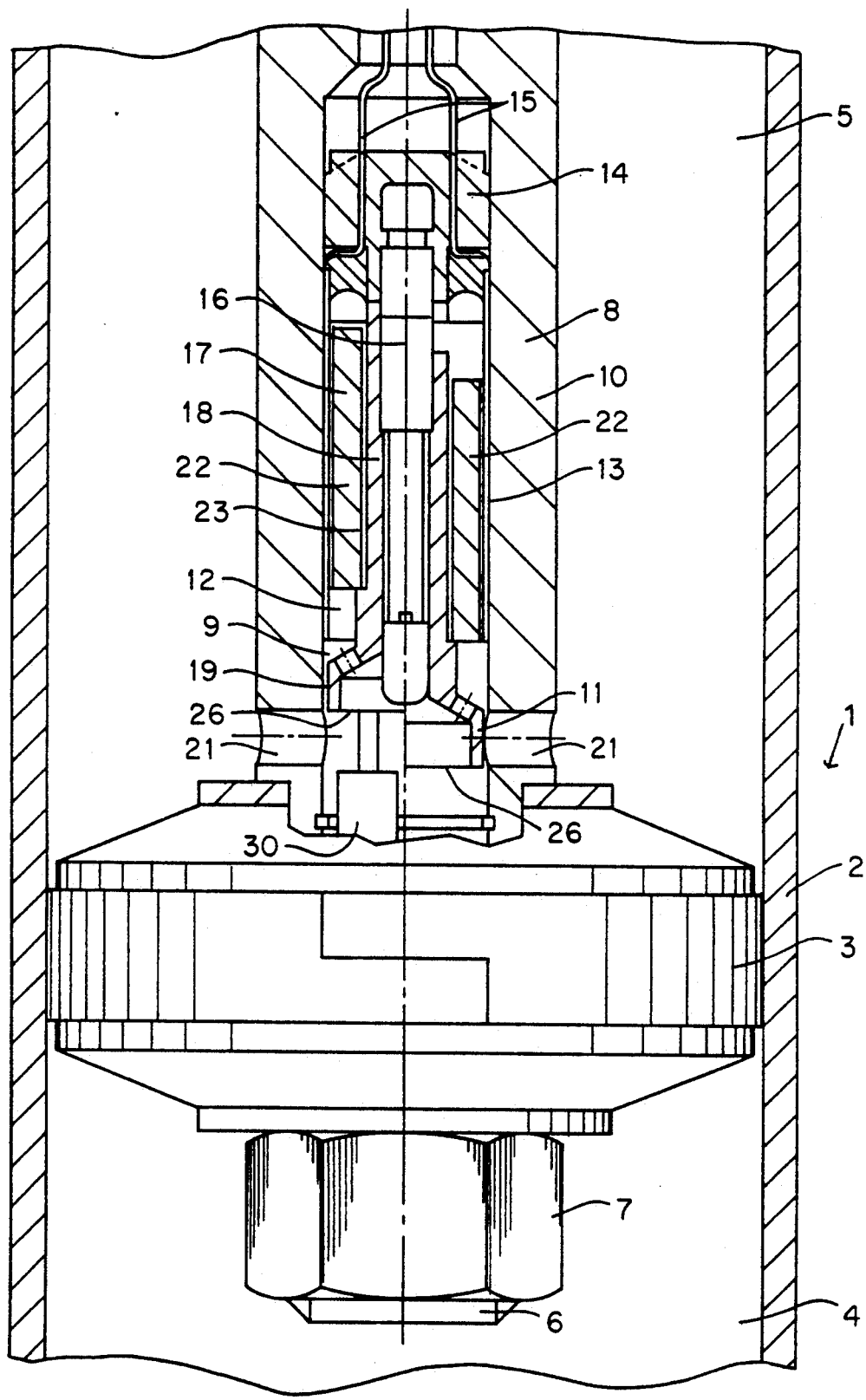

The adjusting component 11 in the embodiment illustrated in FIG. 2 moves back and forth, parallel with the axis of the piston rod. Support 18 has an inside thread that engages an outside thread on a stationary drive shaft 16, inducing a back-and-forth motion in rotor 17 and adjusting component 11. A lifting edge 26 on adjusting component 11 continuously opens and closes the perforations 21 in piston rod 8 and hence the cross-section of the bypass.

We claim:

1. A variable dashpot for producing a damping effect in motor vehicles, comprising: a cylinder filled with vibration-suppressing fluid; a hollow piston with vibration-suppressing valves in said cylinder; a hollow piston rod fastened directly to said piston; said piston separating said cylinder into two compartments communicating through a bypass cross-section adjustable by adjusting means; an electrical motor with motor head held in said hollow piston rod and having a rotor and a stator with windings connected with said motor head; said adjusting means being actuated by said motor; said piston rod being comprised of magnetic material and having a recess for receiving said stator windings; said rotor having permanent magnets, said rotor being held in a bore in said stator, said adjusting means adjusting continuously said bypass cross-section to vary said damping effect, said piston rod of magnetic material being a magnetic path.

2. A variable dashpot as defined in claim 1, wherein said recess in said piston rod has a cylindrical shape.

3. A variable dashpot as defined in claim 1, wherein said rotor of said electric motor is rotatable through an angle not exceeding 360° relative to said stator.

4. A variable dashpot as defined in claim 3, including rotation limiting means having stop means.

5. A variable dashpot as defined in claim 1, wherein said adjusting means is integral with said rotor.

6. A variable dashpot as defined in claim 1, wherein said rotor has a thread engaging another thread for moving said adjusting means back and forth, said adjusting means being non-rotatable.

7. A variable dashpot as defined in claim 1, including a position sensor associated with said rotor.

8. A variable dashpot as defined in claim 1, including a position sensor associated with said adjusting means.

9. A variable dashpot for producing a damping effect in motor vehicles, comprising: a cylinder filled with vibration-suppressing fluid; a piston with vibration-suppressing valves in said cylinder; a hollow piston rod fastened directly to said piston; said piston separating said cylinder into two compartments communicating through a bypass cross-section adjustable by adjusting means; an electrical motor with motor head held in said piston rod and having a rotor and a stator with windings connected with said motor head; said adjusting means being actuated by said motor; said piston rod being comprised of magnetic material and having a recess for receiving said stator windings; said rotor having permanent magnets, said rotor being held in a bore in said stator, said adjusting means adjusting continuously said bypass cross-section to vary said damping effect, said piston rod of magnetic material being a magnetic path; said recess in said piston rod having a cylindrical shape; said rotor of said electrical motor being rotatable through an angle not exceeding 360° relative to said stator; rotation limiting means having stop means; said adjusting means being integral with said rotor; said rotor having a thread engaging another thread for moving said adjusting means back and forth, said adjusting means being non-rotatable; and a position sensor associated with said rotor.

* * * * *